United States Patent
Dreyer et al.

(10) Patent No.: US 8,739,682 B2
(45) Date of Patent: *Jun. 3, 2014

(54) PNEUMATIC ACTUATOR

(71) Applicant: GM Global Technology Operations LLC, Detroit, MI (US)

(72) Inventors: Bernd Dreyer, Taunusstein (DE); Joachim Schaefer, Darmstadt (DE); Erik Wiesinger, Mainz (DE)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/626,695

(22) Filed: Sep. 25, 2012

(65) Prior Publication Data

US 2013/0019743 A1 Jan. 24, 2013

Related U.S. Application Data

(63) Continuation of application No. 12/393,969, filed on Feb. 26, 2009, now Pat. No. 8,316,758.

(30) Foreign Application Priority Data

Feb. 28, 2008 (DE) .......................... 10 2008 011 731

(51) Int. Cl.
*B60R 21/34* (2011.01)
*F15B 15/19* (2006.01)

(52) U.S. Cl.
USPC .................................................. 92/23; 92/15

(58) Field of Classification Search
USPC ............ 92/15, 18, 23, 27, 28; 91/390; 60/407
See application file for complete search history.

(56) References Cited

U.S. PATENT DOCUMENTS

| | | | |
|---|---|---|---|
| 6,942,056 B2 * | 9/2005 | Nadeau et al. ................. | 180/274 |
| 7,559,398 B2 * | 7/2009 | Karlsson ....................... | 180/274 |

(Continued)

FOREIGN PATENT DOCUMENTS

| | | |
|---|---|---|
| AT | 7000 U1 | 7/2004 |
| DE | 1559638 A1 | 5/1970 |

(Continued)

OTHER PUBLICATIONS

German Patent Office, German Search Report for Application No. 102008011731.5, dated Jan. 5, 2009.

(Continued)

*Primary Examiner* — Thomas E Lazo
(74) *Attorney, Agent, or Firm* — Ingrassia Fisher & Lorenz, P.C.

(57) ABSTRACT

A pneumatic actuator is provided for an active hood and includes a cylinder and a piston, which is movable in the cylinder between a lower terminal position, in which the volume of a chamber delimited by piston and cylinder, which may be impinged using compressed gas, is minimal, and an upper terminal position, in which the volume of the chamber is maximal. The piston is lockable in the lower terminal position by a detent body engaging in first recesses of the cylinder and the piston. A slider is displaceable by impingement using the compressed gas out of an idle position, in which it fixes the detent body in the first recesses, into a triggering position, in which a second recess of the slider overlaps with one of the first recesses and is capable, together with a single one of the first recesses of accommodating the detent body.

8 Claims, 2 Drawing Sheets

(56) References Cited

U.S. PATENT DOCUMENTS

| | | | |
|---|---|---|---|
| 8,316,758 B2 * | 11/2012 | Dreyer et al. ............. 92/23 |
| 2002/0011372 A1 | 1/2002 | Sasaki et al. |
| 2007/0186547 A1 | 8/2007 | Kim et al. |
| 2008/0042411 A1 | 2/2008 | Hirooka et al. |
| 2008/0136140 A1 | 6/2008 | Karlsson |
| 2008/0258484 A1 | 10/2008 | Caldwell et al. |
| 2009/0095151 A1 | 4/2009 | Schafer et al. |
| 2010/0089048 A1 | 4/2010 | Schaefer |
| 2012/0011847 A1 | 1/2012 | Borg et al. |

FOREIGN PATENT DOCUMENTS

| | | |
|---|---|---|
| DE | 10249272 A1 | 5/2004 |
| DE | 102004004987 A1 | 12/2004 |
| DE | 102004037060 A1 | 3/2006 |
| DE | 102005034558 A1 | 2/2007 |
| DE | 112005000521 T5 | 2/2007 |
| DE | 102005040706 A1 | 3/2007 |
| DE | 102006008900 A1 | 8/2007 |
| DE | 102006008901 A1 | 8/2007 |
| DE | 102006040203 A1 | 3/2008 |
| EP | 1559638 A2 | 8/2005 |
| EP | 1870301 A1 | 12/2007 |
| EP | 2356341 A1 | 8/2011 |
| WO | 8902987 A1 | 4/1989 |
| WO | 0209983 A2 | 2/2002 |
| WO | 2007007109 A1 | 1/2007 |
| WO | 2010061117 A1 | 6/2010 |

OTHER PUBLICATIONS

UK IPO, British Search Report for Application No. 0902815.0, dated Jun. 26, 2009.
UK IPO, British Examination Report for Application No. 0902815.0, dated Aug. 4, 2011.
UK IPO, British Examination Report for Application No. 1121342.8, dated Apr. 20, 2012.
USPTO, Non-final Office Action issued in U.S. Appl. No. 12/393,969, mailed Apr. 16, 2012.
Response to US Non-final Office Action for U.S. Appl. No. 12/393,969, dated Jul. 7, 2012.
USPTO, Notice of Allowance issued in U.S. Appl. No. 12/393,969, mailed Jul. 25, 2012.

* cited by examiner

PNEUMATIC ACTUATOR

CROSS-REFERENCE TO RELATED APPLICATION

This application is a continuation of U.S. patent application Ser. No. 12/393,969, filed Feb. 26, 2009, which itself claims priority to German Patent Application No. 102008011731.5, filed Feb. 28, 2008, both of which are incorporated herein by reference in their entirety.

TECHNICAL FIELD

The present invention relates to a pneumatic actuator for an active hood of a motor vehicle. At least one object of such an actuator is, if a motor vehicle is involved in an accident, to raise the front hood of the vehicle in the shortest time by feeding compressed gas into a cylinder, in order to thus increase the distance between the hood and parts of the engine block or other non-deformable components of the vehicle lying underneath and thus provide the longest possible deceleration path for a pedestrian possibly impacting the hood, to reduce the danger of severe injuries.

BACKGROUND

A pneumatic actuator for an active hood having a cylinder and a piston is known from AT 7000 U1. In this actuator, gas for driving the piston is generated by one of several pyrotechnic gas generators and is supplied to the cylinder through a filter. In order to avoid a substantial pressure drop at the filter, the cross section of the filter must not be too small.

At least one object of the present invention is to provide a pneumatic actuator for an active hood in which pressure drop at a filter can be kept low in spite of compact dimensions of the filter. In addition, other objects, desirable features, and characteristics will become apparent from the subsequent summary and detailed description, and the appended claims, taken in conjunction with the accompanying drawings and this background.

SUMMARY

The at least one object, other objects, desirable features, and characteristics, are achieved in that, in a pneumatic actuator having a cylinder and a piston which is movable in the cylinder between a lower terminal position, in which the volume of a chamber delimited by piston and cylinder, which may be impinged by compressed gas, is minimal, and an upper terminal position, in which the volume of the chamber is maximal, and which is lockable in the lower terminal position by a detent body which engages in a first recess of a cylinder and the piston, a slider is also provided, which is displaceable by impingement using the compressed gas out of an idle position, in which it fixes the detent body in the first recess, into a triggering position, in which a second recess of the slider overlaps with one of the first recesses and, together with a single one of the first recesses, is capable of accommodating the detent body. Blocking of this type of the movement of the detent body by the slider in the lower terminal position allows the path of the detent body between idle position and trigger position to be made significantly shorter than in the prior art and reliable locking of the piston in the lower terminal position to be ensured nonetheless. Because the duration of the movement of the detent body between idle position and triggering position is also shortened with the path length, the quantity of the gas penetrating into the chamber in this time may be kept low.

While the detent body is active between piston and cylinder and therefore is necessarily subjected to an increased force and thus increased friction in case of penetration of gas into the chamber, this is not true for the slider. Therefore, it may be easily movable, so that even a small quantity of the compressed gas is sufficient to bring it into its triggering position.

A more compact construction results in particular if the first recess, which is capable together with the second recess of accommodating the detent body, is the first recess of the piston.

A contact surface between the detent body and the recess, out of which the detent body disengages when the slider passes into the triggering position, is preferably oriented diagonally to the movement direction of the piston in such a way that a force acting in the movement direction on the piston causes a force driving the detent body out of this first recess transversely to the movement direction. Blocking of the detent body may thus be reliably prevented.

Furthermore, it is preferable for the piston to comprise the slider and a guide body, which guides the movement of the slider between the idle position and the triggering position, and for the first recess of the piston to be formed in the guide body.

A front face of the piston which delimits the chamber may thus be formed by the slider. Compressed gas penetrating into the chamber thus first acts on the slider and displaces it, so that the piston may be unlocked. The force which drives the slider may be made large in that the slider forms a complete front face of the chamber. The piston as a whole, including the guide body, is first raised when the slider has reached the triggering position.

The slider preferably engages in an inner cavity of the piston, and the first recess of the piston is a hole in a wall of the piston which surrounds the cavity. The detent body may thus yield radially inward, toward the piston axis, upon unlocking. The detent body is preferably a ball which simultaneously contacts a wall of the first recess of the cylinder and the slider in the idle position.

To simplify the manufacturing of the actuator, in particular the production of the first recess of the cylinder, the cylinder is preferably assembled from two parts, and the first recess of the cylinder is formed at the boundary of the two parts. The first recess is preferably a peripheral groove on an inner face of the cylinder.

A throttle passage may run through the piston, to allow the exhausting of the compressed gas out of the chamber after reaching the upper terminal position, so that the piston may be moved back into its lower terminal position without great resistance after exhausting the compressed gas. The resetting of the piston into the lower terminal position may thus possibly be performed by a user of the vehicle in which the actuator is installed, and it is not necessary to find a repair shop solely for this purpose.

To keep pressure drop at a filter low in spite of compact dimensions of the filter, a particle filter is expediently provided between a pyrotechnic compressed gas source and the chamber, which keeps the particles contained in the compressed gas stream of the source out of the chamber. The particle filter is preferably situated to deflect a compressed gas stream flowing from the compressed gas source to the chamber on its surface. Thus, particles contained in the stream, which may not follow the deflection of the compressed gas stream because of their mass inertia, may be incident in the particle filter and captured therein.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
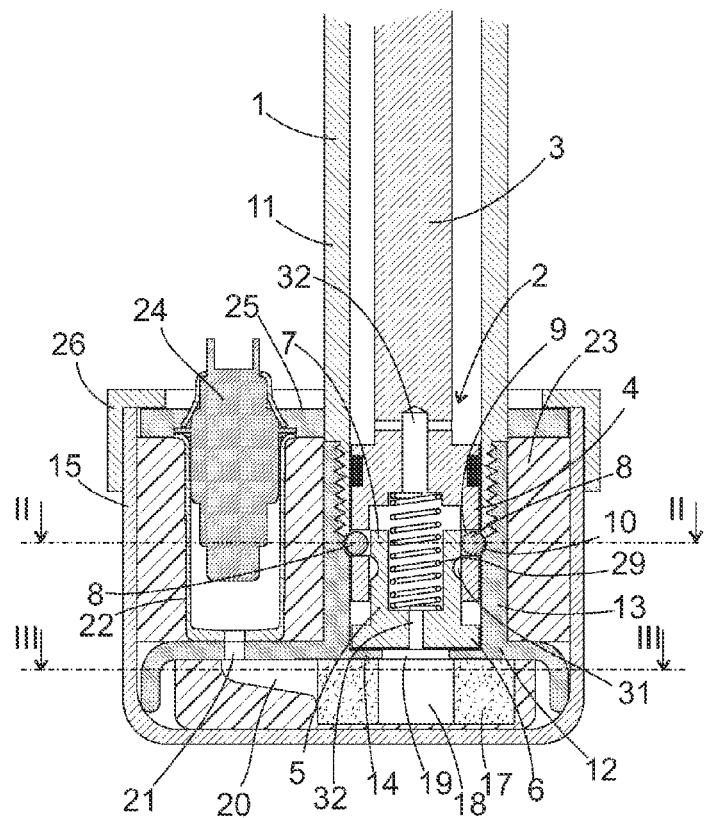
FIG. 1 shows an axial partial section through an actuator according to an embodiment of the invention.
Figure 2:
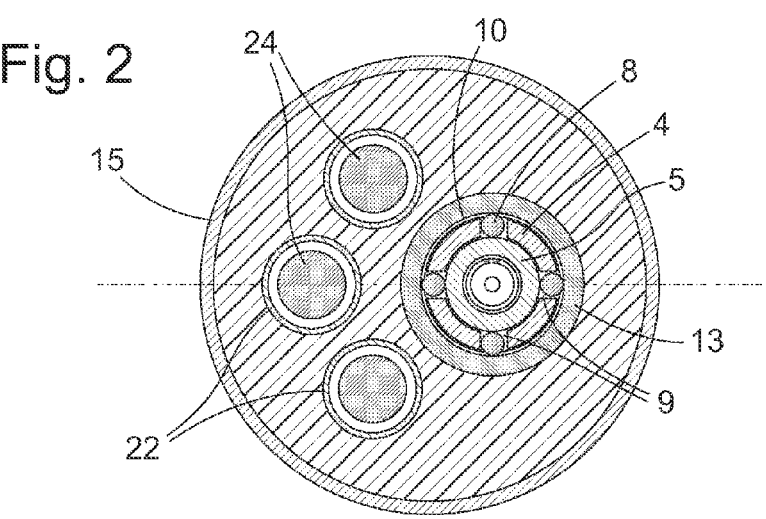
FIG. 2 shows a cross-section through a base of the actuator along plane II-II from FIG. 1.

FIG. 1 shows a section through an actuator according to an embodiment of the invention along the longitudinal axis of its cylinder 1 (only partially shown in this figure). A piston 2, which is displaceable in the cylinder 1, is fastened via a piston rod 3 exiting at an upper end of the cylinder 1 (not shown) to an engine hood of a motor vehicle to be raised by the actuator. The entire actuator is mounted in the vehicle body structure of a motor vehicle concealed under the engine hood.

The piston 2 comprises a hollow-cylindrical piston skirt 4, which is permanently connected to the piston rod 3 and is open on the bottom, and a slider 5 of essentially cylindrical design, which engages in a cavity enclosed by the piston skirt 4. The bottom side of the slider 5 is enlarged by a peripheral shoulder 6, so that it fills up the free cross-section of the cylinder 1 except for a slight play.

In the configuration shown in FIG. 1, a head section 7 of the slider 5 retains a plurality of detent balls 8 blocked in a position, in which they are partially accommodated by holes 9 of the piston skirt 4 and partially engage in a peripheral groove 10 on the interior side of the cylinder 1. The detent balls 8 keep the piston 2 solidly locked, so that the engine hood is solidly anchored on the motor vehicle body via the actuator.

The cylinder 1 is assembled from multiple parts, of which the figure shows an elongate pipe part 11 and a base part 12. The base part 12 comprises a pipe socket 13, into which the pipe part 11 is screwed, and a floor plate 14. The pipe part 11 and the pipe socket 13 adjoin one another at the height of the groove 10. This simplifies the manufacturing of the cylinder 1, because pipe part 11 and base part 12 may be kept free of undercuts.

Base part 12 is accommodated in a pot-shaped housing 15. The floor plate 14 divides the interior of the housing into a lower chamber and an upper chamber which encloses the pipe socket 13.

Figure 3:
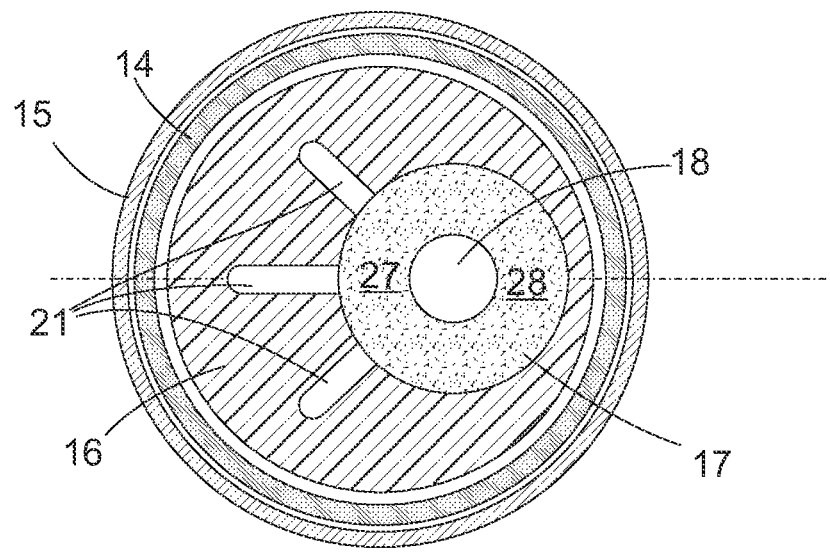
FIG. 3 shows a cross-section along plane from FIG. 1.

As the cross-section of FIG. 3 shows, the lower chamber is filled up in large part by a molded body 16. An annular or tubular filter body 17 is housed in a flat-cylindrical recess of the molded body 16. An inner cavity 18 of the filter body 17 communicates with the cylinder 1 via an opening 19 in the floor plate 14.

Channels 20 worked into the top side of the molded body 16 run toward the filter body 17. A further opening 21 is formed in the floor plate 14, which connects the channel 20 to the interior of a sleeve 22, on the end of each channel 20 facing away from the filter body 17. The sleeves 22 are embedded in a molded body 23, which fills up the upper chamber of the housing 15, and each contain a gas generator 24. The gas generators 24 are fixed in a formfitting way in the sleeves 22 by a shared cover plate 25, which is in turn retained by a ring 26 screwed onto the upper edge of the housing 15.

If one of the gas generators 24 is triggered by an electrical impulse during an accident, released compressed gas flows through the opening 21 of the floor plate 14 and the channel 20 to the filter body 17. It passes a section 27 of the filter body 17 facing toward the channel 20, a part of the particles entrained in the gas stream being captured in the section 27. The gas stream is deflected at a right angle, perpendicularly to the section plane of FIG. 3, in the inner cavity 18 of the filter body 17 and flows through the opening 19 into the cylinder 1. The particles still entrained in the gas stream after the passage through the section 27 are too sluggish to follow the direction change and impact in a section 28 of the filter body 17 facing away from the channels 20, where they remain stuck.

Figure 4:
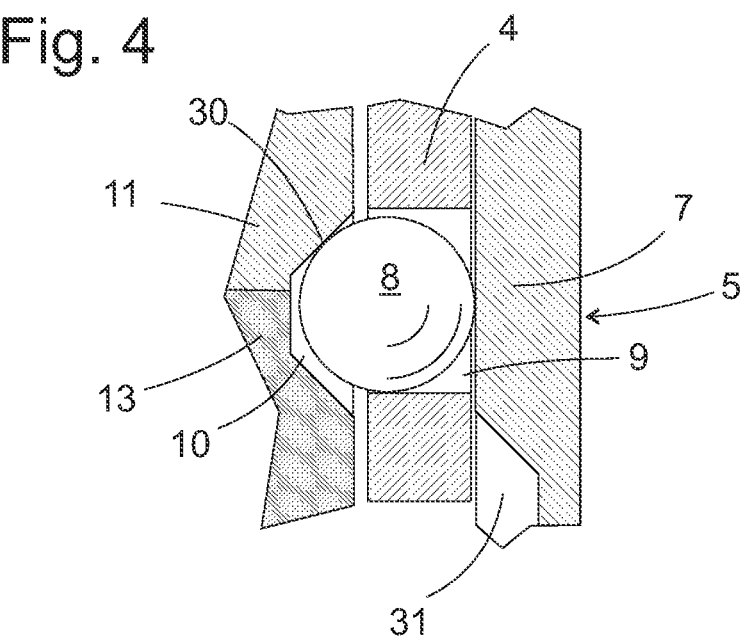
FIG. 4 shows a greatly enlarged detail of FIG. 1.

The compressed gas freed of particles in this way first presses the slider 5 upward in the cylinder 1. A coiled spring 29, which is housed in a central cavity of the piston 2 between the slider 5 and the piston skirt 4, is elastically compressed. The piston rod 3 may initially not follow the pressure of the gas, because the detent balls 8 block an upward movement of the piston skirt 4. The piston skirt 4 transmits the upwardly directed force transmitted by the spring 29 onto the detent balls 8, so that they, as shown in the enlarged illustration of FIG. 4, are clamped between a bottom side of the hole 9 and a diagonal wall 30 of the groove 10 which slopes outward. The wall 30 compensates for the upwardly directed force of the spring 29 and simultaneously exerts a force on the detent balls 8 which is directed radially inward, toward the axis of the cylinder 1. In the configuration of FIG. 1 and FIG. 4, this radial force is captured by the head section 7 of the slider 5.

When the slider 5 moves upward under the influence of the compressed gas, on the one hand an upwardly directed force and on the other hand a torque, which both act on the detent balls 8, result from the friction between the detent balls 8 and the head section 7. The upward force decreases the friction between the catch balls 8 and the bottom side of the hole 9 and encourages a rotation of the detent balls 8. If a peripheral groove 31 of the slider 5 below the head section 7 reaches the height of the holes 9, the balls may easily yield to the force of the wall 30 directed radially inward, so that they slip out of the groove 10 and into the groove 31. The piston 2 is thus unlocked and moves upward under the pressure of the gas flowing into the cylinder 1 up to an upper stop on the upper end of the cylinder 1 (not shown). The hood is raised in this position.

As long as the piston 2 is raised, the balls 8 may not leave the groove 31 again, so that in this time the slider 5 is locked in a raised position, having compressed coiled spring 29, on the piston skirt 4.

A throttle hole 32 extending in multiple sections through the piston 2 allows a slow exhausting of the compressed gas, so that the piston 2 sinks again with a certain delay after the raising of the hood, driven by the weight of the hood or a moderate pressure externally exerted on the hood. As soon as the detent balls 8 have reached the height of the groove 10 again, they catch in it, driven by the coiled spring 29, thus engage the piston skirt in the cylinder 1 and simultaneously disengage the locking of the slider 5 on the piston skirt 4. The slider 5 returns into the idle position shown in FIG. 1 under the pressure of the spring 29. The actuator is thus ready for another actuation by triggering of a further gas generator 24, without requiring a repair intervention. The gas generators 24 and preferably also the filter body 17 only have to be replaced when they have all been consumed.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A pyrotechnic actuator for an active hood, comprising
a container for a gas generator;
a cylinder incorporating a moving piston;
a compressed gas line that joins the container with the cylinder; and
a filter body that is arranged on the compressed gas line, wherein the filter body is situated to deflect on its surface a gas stream passing through the compressed gas line.

2. The pyrotechnic actuator according to claim 1, wherein the filter body crosses the compressed gas line.

3. The pyrotechnic actuator according to claim 2, wherein the filter body that deflects the gas stream and the filter body crossing the compressed gas line are sections of the same filter body.

4. The pyrotechnic actuator according to claim 3, wherein said same filter body is a hollow item, and an inner cavity of said same filter body forms a downstream section of the compressed gas line.

5. The pyrotechnic actuator according to claim 4, wherein said same filter body is tubular, a first section of the tubular filter body facing towards an upstream section of the compressed gas line and a second section of the tubular filter body facing away from said upstream section.

6. The pyrotechnic actuator according to claim 1, wherein at the filter body the gas stream is deflected at a right angle.

7. The pyrotechnic actuator according to claim 1, wherein a plurality of upstream sections are aligned toward a plurality of sections of the filter body.

8. The pyrotechnic actuator according to claim 7, wherein the sections of the filter body crossing the compressed gas line lie on one half of its periphery, and the sections that deflect the gas stream lie on a second half of the periphery.

* * * * *